(12) United States Patent
Perach et al.

(10) Patent No.: US 7,047,120 B2
(45) Date of Patent: May 16, 2006

(54) VEHICLE AND METHOD FOR CONTROLLING BRAKE SYSTEM INDICATORS

(75) Inventors: Asi Perach, Farmington Hills, MI (US); Curtis Tyson, Canton, MI (US); Joseph Root, Kalamazoo, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 10/709,111

(22) Filed: Apr. 14, 2004

(65) Prior Publication Data

US 2005/0234627 A1 Oct. 20, 2005

(51) Int. Cl.
*B60B 39/00* (2006.01)
(52) U.S. Cl. ............... 701/71; 701/70; 303/122.14; 303/152
(58) Field of Classification Search ............ 701/70, 701/71, 79, 83; 303/122.14, 132, 152; 73/121
See application file for complete search history.

(56) References Cited

U.S. PATENT DOCUMENTS

| | | | |
|---|---|---|---|
| 6,480,106 B1 | 11/2002 | Crombez et al. | 340/461 |
| 6,500,574 B1 | 12/2002 | Keegan | 429/23 |
| 6,522,955 B1 | 2/2003 | Colborn | 700/286 |
| 2002/0192519 A1 | 12/2002 | Fujita et al. | 429/23 |
| 2003/0112134 A1 | 6/2003 | Amagasa | 340/438 |
| 2003/0137278 A1 | 7/2003 | Kondo | 320/132 |
| 2005/0045058 A1* | 3/2005 | Donnelly et al. | 105/26.05 |

* cited by examiner

*Primary Examiner*—Gertrude A. Jeanglaude
(74) *Attorney, Agent, or Firm*—Brooks Kushman P.C.; David B. Kelley

(57) ABSTRACT

An instrument panel for a vehicle has an anti-lock braking system and a regenerative braking system. A method is used to control the brake system indicators on the instrument panel. If it is determined that an anomalous condition exists in either the anti-lock braking system or the regenerative braking system, a first indicator is illuminated in an amber color to alert the vehicle operator of this condition. If the anti-lock braking system is active, and there is no anomalous condition detected in the anti-lock braking system, a second indicator is illuminated in green to alert the vehicle operator that the anti-lock braking system is active. Control of the first and second indicators is provided in accordance with a hierarchal structure that gives priority to an anomalous condition in the anti-lock braking system.

22 Claims, 3 Drawing Sheets

VEHICLE AND METHOD FOR CONTROLLING BRAKE SYSTEM INDICATORS

BACKGROUND OF INVENTION

1. Field of the Invention

The present invention relates to a vehicle and method for controlling brake system indicators.

2. Background Art

Many non-conventional vehicles, such as fuel cell vehicles (FCV's), hybrid electric vehicles (HEV's) and electric vehicles (EV's), use electro-hydraulic brake (EHB) systems with anti-lock braking systems (ABS) and regenerative braking systems (RBS). In these vehicles the EHB system may not provide brake pedal feedback to the vehicle operator when the ABS is active—i.e., when the ABS is in use. Without the brake pedal feedback, the vehicle operator may experience an unusual feel in the vehicle dynamics when the vehicle goes into an ABS event. This is in contrast to a vehicle having a mechanical ABS which provides pedal feedback to the vehicle operator when the ABS is active. This feedback makes the vehicle operator aware of the activity, and the vehicle operator knows not to pump the brake pedal to bring the vehicle to a stop.

Because EHB systems isolate the hydraulic circuit from the pedal, there are no brake pedal pulsations to provide feedback to notify the vehicle operator of an ABS action. The vehicle operator may experience unusual vehicle movements associated with the vehicle dynamics when the ABS is active. This change in feel may prompt the vehicle operator to pump the brake pedal, and thereby defeat the function of the ABS controller and diminish braking ability.

In addition, it may be desirable to provide a visual indication of the operating status of the vehicle's ABS or RBS. In this way, the vehicle operator will know that the braking system should be examined by a service technician. Because of the limited space available on vehicle instrument panels, it may also be desirable to combine two or more indicators in a single display window. This may be accomplished, for example, by displaying each indicator in a different color so the vehicle operator knows which information is being conveyed.

Therefore, a need exists for an instrument panel that includes indicators to provide feedback to a vehicle operator when an ABS event is occurring, and to indicate to the vehicle operator if an anomalous condition exists in the ABS or RBS.

SUMMARY OF INVENTION

Accordingly, the present invention provides an instrument panel for a vehicle that includes an indicator to provide feedback to a vehicle operator than an ABS event is occurring.

The invention also provides an instrument panel for a vehicle including an indicator that indicates to a vehicle operator when an anomalous condition exists in an anti-lock braking system or a regenerative braking system.

The invention further provides an instrument panel for a vehicle including indicators to provide feedback to a vehicle operator that an ABS event is occurring, and also to indicate to the vehicle operator when an anomalous condition exists in an anti-lock braking system or a regenerative braking system, where both indicators are displayed in different colors within a single display window.

The invention also provides an instrument panel for a vehicle having an anti-lock braking system and a regenerative braking system. The instrument panel includes a first indicator configured to be displayed in a first color when an anomalous condition is detected in either the anti-lock braking system or the regenerative braking system. A second indicator is configured to be displayed in a second color different from the first color when the anti-lock braking system is active. This provides a visual feedback to an operator of the vehicle.

The invention further provides a method for indicating braking system information in a vehicle having an anti-lock braking system and a regenerative braking system. The method includes indicating in a first color the presence of an anomalous condition in an anti-lock braking system when it is determined that an anomalous condition exists in the anti-lock braking system. The occurrence of an anti-lock braking system event is indicated in a second color different from the first color when it is determined that an anti-lock braking system event is occurring and an anomalous condition does not exist in the anti-lock braking system. The presence of an anomalous condition in the regenerative braking system is indicated in the first color when it is determined that an anomalous condition exists in the regenerative braking system and an anti-lock braking system event is not occurring.

The invention also provides a vehicle including an anti-lock braking system and a regenerative braking system. The vehicle also includes an instrument panel including a first indicator and a second indicator. The first indicator is configured to be displayed in a first color when an anomalous condition is detected in either the anti-lock braking system or the regenerative braking system. The second indicator is configured to be displayed in a second color different from the first color when the anti-lock braking system is active. This provides visual feedback to an operator of the vehicle.

BRIEF DESCRIPTION OF DRAWINGS

FIGS. 3A–3C are front plan views of a display window configured for use in an instrument panel, such as the instrument panel shown in FIG. 2;

DETAILED DESCRIPTION

Figure 1:
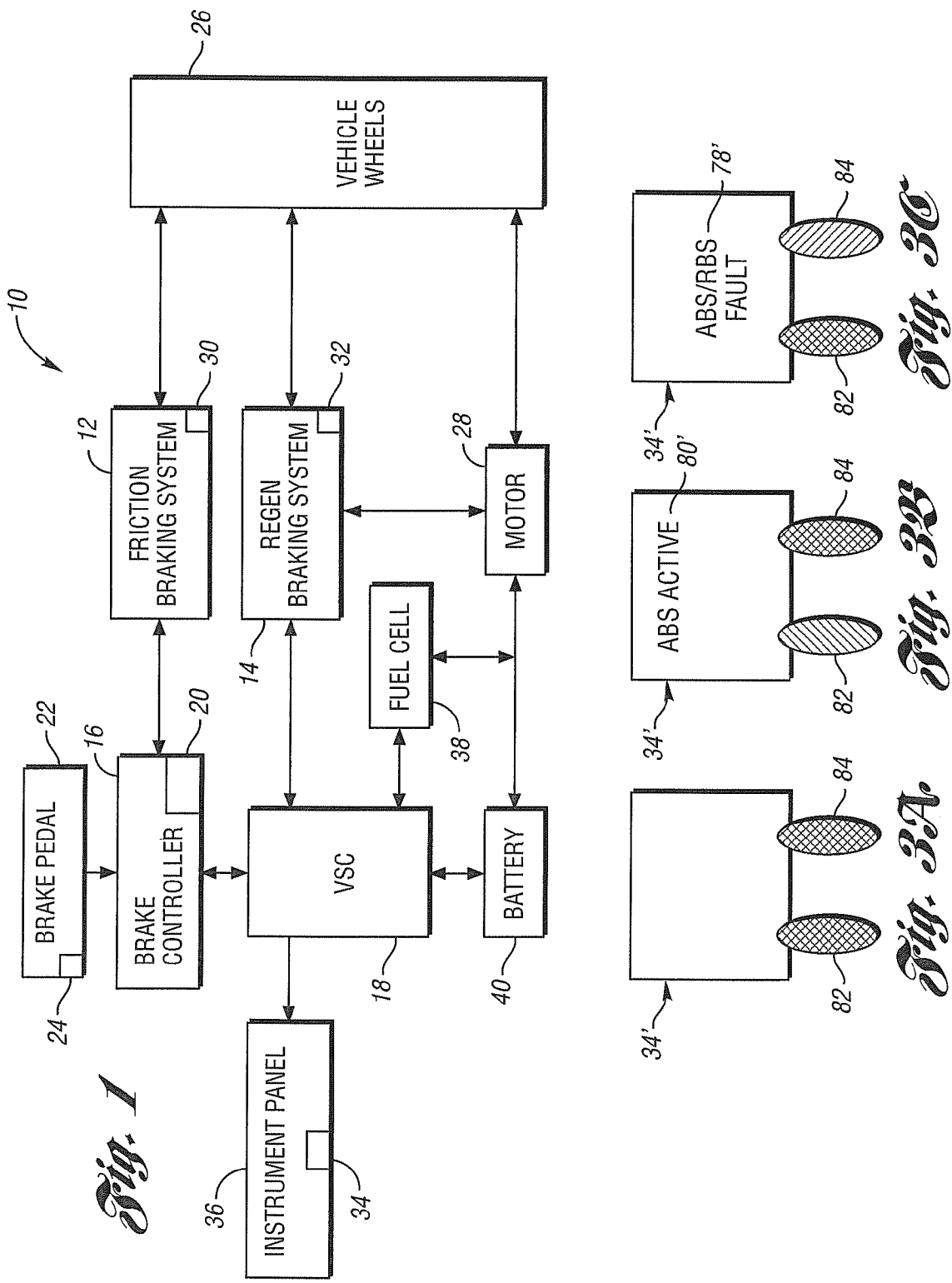
FIG. 1 is a simplified schematic representation of a vehicle in accordance with the present invention.

FIG. 1 shows a simplified schematic diagram of a portion of a vehicle 10 in accordance with the present invention. The vehicle 10 includes a friction braking system 12 and a regenerative braking system (RBS) 14. A brake controller 16 is shown in communication with the friction braking system 12 and a vehicle system controller (VSC) 18. Although a single brake controller is shown in FIG. 1, a vehicle, such as the vehicle 10 may include separate brake controllers for the friction braking system 12 and the RBS 14. Although FIG. 1 shows the brake controller 16 communicating directly with the friction braking system 12, but not the RBS 14, it is understood that the brake controller 16 can communicate with the RBS 14 through the VSC 18. In addition, the VSC 18 may incorporate the brake controller 16, or other controllers, such as a powertrain control module (PCM). Thus, the various systems within the vehicle 10 can be controlled by a single controller, separate software controllers within a single hardware device, or a combination of separate software and hardware controllers.

The brake controller 16 includes an anti-lock braking system (ABS) 20. The brake controller 16 receives vehicle operator inputs from a brake pedal 22. In particular, a brake sensor 24 is configured to detect the position of the brake pedal 20 and send one more signals to the brake controller 16. The VSC 18 and the brake controller 16 use various inputs, including the inputs from the sensor 24, to decide how to control the friction braking system 12 and the RBS 14.

The friction braking system 12 operates to slow the speed of vehicle wheels 26 through the application of one or more friction elements in accordance with methods well known in the art. Similarly, the RBS 14 is operable to reduce the speed of the vehicle wheels 26 by controlling a motor 28 to produce a negative torque, which is transferred to the vehicle wheels 26.

The friction braking system 12 includes one or more sensors, represented in FIG. 1 by a single sensor 30. The sensor 30 is configured to send signals to the brake controller 16 related to various conditions within the friction braking system 12. For example, if the friction braking system 12 should experience reduced braking capability, perhaps due to a loss of boost or the loss of a hydraulic circuit, the sensor 30 can communicate this condition to the brake controller 16, which in turn communicates with the VSC 18.

Similarly, the RBS 14 includes one or more sensors, represented in FIG. 1 by the sensor 32. The sensor 32 may detect a variety of conditions, including the presence of any anomalous conditions within the RBS 14. Such anomalous conditions may include an electrical anomaly within the system, or a communication error between the RBS 14 and other components in the vehicle 10. Of course, these are just a few examples of the various conditions that may constitute an anomalous condition within a regenerative braking system, such as the RBS 14. Similarly, the ABS 20 may have one or more sensors (not shown) to detect and communicate the existence of an anomalous condition within the ABS 20.

If an anomalous condition is detected in the friction braking system 12, the RBS 14 or the ABS 20, it can be communicated to the VSC 18. The VSC 18 can be programmed to handle the existence of these anomalous conditions in a number of different ways, including providing an output to a vehicle operator through a display window 34 in an instrument panel 36. In addition to indicating the presence of anomalous conditions in one or more of the vehicle braking systems, the display window 34 can also include an indicator or indicators that provide a display when the ABS 20 is active. This can be particularly beneficial when the friction braking system 12 is not being employed. Without the mechanical feedback provided by the friction braking system 12, a vehicle operator may be unaware that the ABS 20 is active. Thus, the use of indicators in the display window 34, informs the vehicle operator that the ABS 20 is active, and the brake pedal 22 should not be pumped.

The vehicle 10, shown in FIG. 1, is a fuel cell vehicle that includes a fuel cell 38 that can provide power directly to the motor 28, or to a battery 40. Of course, a vehicle, such as the vehicle 10, may alternately be configured with an internal combustion engine or additional torque producing devices. Thus, the present invention is applicable to a wide variety of vehicle platforms, with the fuel cell vehicle illustrated in FIG. 1 being but one example.

Figure 2:
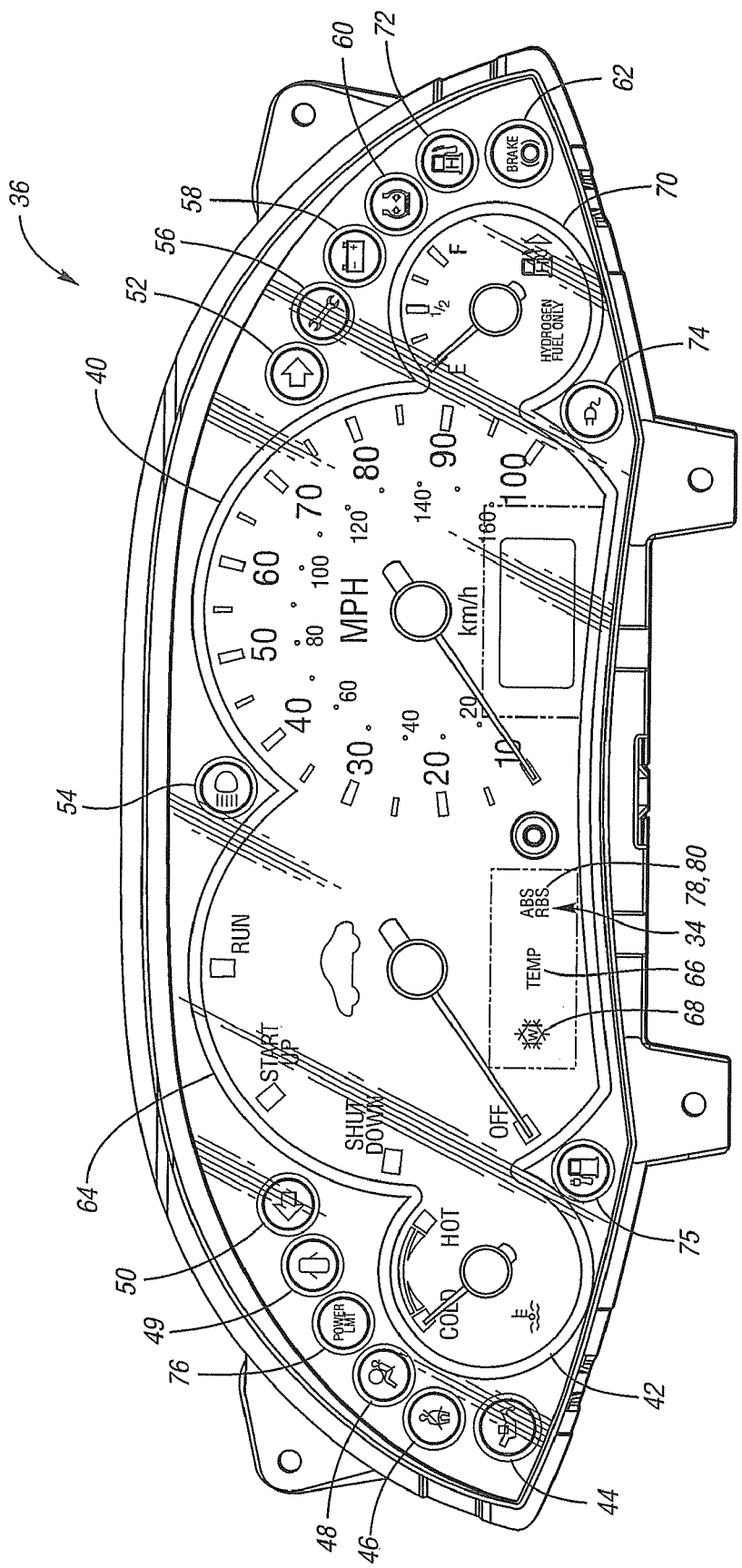
FIG. 2 is a front plan view of a portion of an instrument panel configured for use with the vehicle represented in FIG. 1.

FIG. 2 shows a portion of the instrument panel 36 in detail. The indicator 34 is only one of many different indicators on the instrument panel 36. Particularly with today's non-conventional vehicles, such as fuel cell vehicles and HEV's, there is a multitude of information that can be displayed for the vehicle operator. For example, the instrument panel 36, shown in FIG. 2, includes some "standard" indicators, such as a speedometer 40, a coolant temperature indicator 42, an oil pressure indicator 44, a seatbelt indicator 46, an air bag indicator 48, a door open indicator 49, left and right turn signal indicators 50, 52, a high-beam headlight indicator 54, a malfunction indicator light (MIL) 56, a battery charge indicator 58, a tire pressure indicator 60, and a parking brake indicator 62.

In addition to these standard indicators, the instrument panel 36 also includes a number of indicators that are not found on conventional vehicles. For example, a indicator 64 shows the state of the fuel cell 38. The indicator 64 provides a vehicle operator with various information relevant to the fuel cell state, such as when the fuel cell is starting ("START UP"). The start up condition may last for 30–50 seconds, after which time the fuel cell begins to produce electricity ("RUN"). The indicator 64 also tells the vehicle operator when the fuel cell is shutting down ("SHUT DOWN"), and when it is off ("OFF"). The shut down and start up states are selected by the vehicle operator by moving a key to an appropriate position. When the start up state is selected, the indicator 64 will automatically move to the run state when a threshold is reached for the fuel cell to produce electricity. Similarly, when the shut down state is selected, the indicator 64 will automatically move to the off state when the fuel cell has completed shutting down.

The instrument panel 36 includes a fuel cell high temperature indicator 66, which may be specifically directed to the temperature of the fuel cell stack. A winter mode indicator 68 conveys to the vehicle operator that the vehicle 10 is in a traction mode, which may be beneficial for winter driving. A fuel gage 70 indicates to the vehicle operator the hydrogen fuel level, while an indicator light 72 alerts the vehicle operator that the hydrogen fuel is low. This is analogous to a gasoline fuel level and indicator system in a conventional vehicle.

In addition to the previously mentioned indicators, the instrument panel 36 also includes an indicator 74 that indicates that the high voltage battery 40 is being charged. Indicator 75 alerts the vehicle operator that the state of charge of the high voltage battery 40 is low. This is in contrast to the indicator 58, which alerts the vehicle operator to the charge level of a 12 volt battery used to run low voltage systems within the vehicle 10. A power limit indicator 76 is used to alert the vehicle operator when full acceleration of the vehicle 10 is not possible, which may be a function of the state of the fuel cell 38, the state of the battery 40, some combination thereof, or of some other systems within the vehicle 10.

In order to provide a vehicle operator with information about the vehicle braking systems, the indicators in the display window 34 are specifically configured to be displayed in two different colors. In one embodiment, first and second indicators 78, 80 in the display window 34 have the same label, but are displayed in different colors. The first indicator 78 is configured to be displayed in a first color, for example, amber, when an anomalous condition is detected in either the ABS 20 or the RBS 14. When the first indicator 78 is displayed, the letters "ABS" and "RBS" are both displayed in an amber color. Of course amber is used for illustrative purposes, and any desired color may be used.

By contrast, the second indicator 80 is configured to be displayed in a second color, which is different from the first color—e.g., green—when the ABS 20 is active. This provides a visual feedback to the vehicle operator to indicate that the ABS 20 is in use. When the second indicator 80 is displayed, the letters "ABS" and "RBS" will both be illuminated, just as when there is an anomalous condition in the ABS 20 or RBS 14; however, the letters will be illuminated with a different color, thereby providing a "second" indicator that indicates to the vehicle operator that the ABS 20 is active. In the embodiment shown in FIG. 2, the first and second indicators 78, 80 are integrated into a single display window 34, thereby providing a space savings on the instrument panel 36. This can be particularly important when it is desired to provide many different indicators to a vehicle operator within a reasonably small area on an instrument panel.

Of course, first and second indicators, such as the first and second indicators 78, 80, may have different labels and still placed in close proximity to each other—e.g., within a single display window. FIGS. 3A–3C show an alternative configuration for an instrument panel display window 34'. The display window 34' includes first and second indicators 78', 80'. As with the indicator 78, the indicator 78' is configured to be displayed in amber when an anomalous condition is detected in either the ABS 20 or the RBS 14. Similarly, the second indicator 80' is configured to be displayed in green when the ABS 20 is active. As shown in FIGS. 3B–3C, the first and second indicators 78', 80' use different labels, as well as different colors, to further define the information provided to the vehicle operator. For example, the first indicator 78' is provided with a first label which reads "ABS/RBS FAULT"—see FIG. 3C. Conversely, the second indicator 80' is provided with a label that reads "ABS ACTIVE"—see FIG. 3B.

As noted above, the first and second indicators 78', 80' are displayed within a single display window 34'. In order to illuminate the indicators 78', 80', a pair of colored light sources 82, 84 are provided. The light sources 82, 84 may be conventional incandescent bulbs, or any other type of light source that functions to illuminate the indicators 78', 80'. For example, in FIGS. 3A–3C, the light sources 82, 84 are light emitting diodes (LED's).

Because the indicators 78', 80' are contained within a single display window 34', it is necessary to provide some filter to inhibit visibility of one indicator when the other indicator is illuminated. This can be accomplished by providing a label for each indicator that has the color of the opposite LED. For example, it is desired to have the first indicator 78' illuminated with the amber LED 84, and at the same time inhibit illumination of the second indicator 80'. To accomplish this, the label "ABS ACTIVE" of the second indicator 80' can be provided in an amber color such that it will not appear to be illuminated when the LED 84 is lit. Similarly, the label "ABS/RBS FAULT" on the first indicator 78' can be provided in a green color that matches the color of the LED 82. In this way, the second indicator 80' will be illuminated by the LED 82, but illumination of the first indicator 78' will be inhibited.

In order to provide a vehicle operator with a variety of information in a small area, the present invention contemplates the use of a hierarchal structure with regard to the illumination of the brake system indicators, such as the indicators 78, 80 or the indicators 78', 80'. In general, the hierarchal structure is configured such that an anomalous condition in the ABS has first priority, an ABS event—i.e., the ABS 20 is active—has second priority, and an anomalous condition in the RBS has third priority. This is illustrated in the chart shown in FIG. 4.

Whenever an anomalous condition in the ABS exists, indicated by the numeral 1 in the far left column, the presence of an anomalous condition in the RBS, or an ABS event, is a "no action" event. Thus, the amber lamp illuminating the first indicator 78 (or 78'), will be lit. The second priority is when the ABS is active, which is indicated by the numeral 1 in the middle column. In each instance where the ABS is active, and there is no anomalous condition in the ABS, the second indicator 80 (or 80') is illuminated by the green lamp, regardless of whether an anomalous condition exists in the RBS. Finally, if an anomalous condition exists in the RBS and the ABS is not active, the first indicator 78 (or 78') will be illuminated by the amber light. Of course, if there are no anomalous conditions and the ABS is not active, neither of the indicators will be illuminated.

Figures 4, 5:
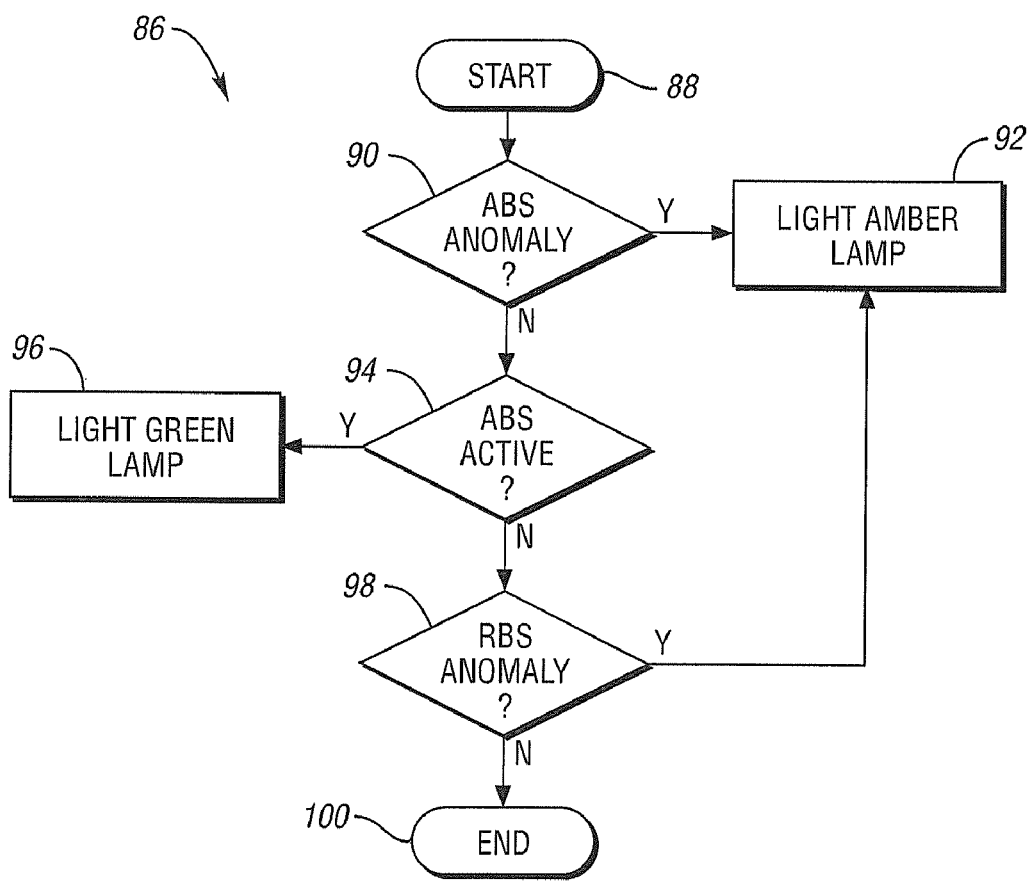
FIG. 4 is a chart illustrating a hierarchal structure associated with control of braking system indicators of the vehicle shown in FIG. 1.
FIG. 5 is a flowchart illustrating a method for controlling the braking system indicators in accordance with the present invention.

An implementation of the use of the brake system indicators and the hierarchal structure is illustrated in the flowchart 86 shown in FIG. 5. The method starts at step 88, and a determination is then made at step 90 as to whether an anomalous condition exists in the ABS. If the answer is yes, the amber lamp is lit—see step 92—thereby illuminating the first indicator, such as the indicator 78 or 78'. It is worth noting here that the term "lamp" as used herein and throughout, is a generic term indicating a light source, and can represent any type of light source which functions to illuminate the indicator. If it is determined at step 90 that no anomalous condition exists in the ABS, a determination is then made at step 94 as to whether the ABS is active. If it is determined that the ABS is active, the green lamp is lit—see step 96—thereby illuminating a second indicator, such as the indicator 80 or 80'.

The determination of whether there is an anomalous condition in the brake system, or whether the ABS is active, is an ongoing process which is updated at some predetermined frequency. Therefore, if an anomalous condition in the ABS is detected while the ABS is active and the green lamp is lit, the green lamp will be extinguished in favor of the amber lamp because an anomalous condition in the ABS takes precedence over an ABS active event. If, at step 94, it is determined that the ABS is not active, it is next determined at step 98 whether an anomalous condition exists in the RBS. If an anomalous condition does exist in the RBS, the amber lamp is lit—see step 92—thereby illuminating a first indicator, such as the indicator 78 or 78'.

As discussed above, the various systems within the vehicle 10 are being monitored at some predetermined frequency. Therefore, if an ABS active event is detected while the amber lamp is lit because of an anomalous condition in the RBS, the ABS active event will take precedence, the amber lamp will be extinguished, and the green lamp will be lit. If the anomalous condition in the RBS still exists when the ABS event has ended, the method returns to step 92 and the amber lamp will again be lit.

If no anomalous conditions are detected and the ABS is not active, the method ends at step 100. It is, however, understood that the systems within the vehicle 10 are being monitored at some predetermined frequency, so that the method illustrated in the flowchart 86 does not literally "end". Moreover, the flowchart 86 is illustrated as if the various steps take place in chronological order, but this is not necessarily the case. Rather, the setup of the flowchart 86 illustrates the hierarchal structure of how the various brake system indicators are controlled. Thus, the present invention provides relevant information to a vehicle operator that may act as a substitute for mechanical feedback, and does so in a small display window, thereby conserving space on the instrument panel.

While the best mode for carrying out the invention has been described in detail, those familiar with the art to which this invention relates will recognize various alternative designs and embodiments for practicing the invention as defined by the following claims.

The invention claimed is:

1. An instrument panel for a vehicle having an anti-lock braking system and a regenerative braking system, the instrument panel comprising:
a first indicator configured to be displayed in a first color when an anomalous condition is detected in either the anti-lock braking system or the regenerative braking system; and
a second indicator configured to be displayed in a second color different from the first color when the anti-lock braking system is active, thereby providing a visual feedback to an operator of the vehicle.

2. The instrument panel of claim 1, wherein the first indicator and the second indicator are contained in a single display window, thereby providing a space savings on the instrument panel.

3. The instrument panel of claim 1, the vehicle including a fuel cell, the instrument panel further comprising a fuel cell state indicator.

4. The instrument panel of claim 1, further comprising at least one light source for displaying the first indicator and the second indicator, the at least one light source being configured to emit light having the first color, and further configured to emit light having the second color.

5. The instrument panel of claim 4, wherein the first indicator includes a label having the second color, thereby inhibiting visibility of the first indicator when the second indicator is being displayed; and
wherein the second indicator includes a label having the first color, thereby inhibiting visibility of the second indicator when the first indicator is being displayed.

6. The instrument panel of claim 5, wherein the at least one light source includes a light emitting diode.

7. The instrument panel of claim 1, wherein the second indicator is displayed in the second color only when the anti-lock braking system is active and an anomalous condition is not detected in the anti-lock braking system.

8. The instrument panel of claim 7, wherein the first indicator is displayed in the first color when an anomalous condition is detected in the regenerative braking system and the anti-lock braking system is not active.

9. A method for indicating braking system information in a vehicle having an anti-lock braking system and a regenerative braking system, the method comprising:
indicating in a first color the presence of an anomalous condition in the anti-lock braking system when it is determined that an anomalous condition exists in the anti-lock braking system;
indicating in a second color different from the first color the occurrence of an anti-lock braking system event when it is determined that an anti-lock braking system event is occurring and an anomalous condition does not exist in the anti-lock braking system; and
indicating in the first color the presence of an anomalous condition in the regenerative braking system when it is determined that an anomalous condition exists in the regenerative braking system and an anti-lock braking system event is not occurring.

10. The method of claim 9, wherein an anomalous condition in the anti-lock braking system, an anti-lock braking system event, and an anomalous condition in the regenerative braking system are each indicated on a vehicle instrument panel display.

11. The method of claim 10, wherein an anomalous condition in the anti-lock braking system, an anti-lock braking system event, and an anomalous condition in the regenerative braking system are all indicated in a single display window, thereby conserving space on the instrument panel.

12. The method of claim 9, further comprising a hierarchal structure, the hierarchal structure being configured such that an anomalous condition in the anti-lock braking system has first priority, an anti-lock braking system event has second priority, and an anomalous condition in the regenerative braking system has third priority.

13. The method of claim 12, further comprising ending indication of an anti-lock braking system event while the anti-lock braking event is in progress when it is determined that an anomalous condition exists in the anti-lock braking system.

14. The method of claim 12, further comprising:
ending indication of an anomalous condition in the regenerative braking system while the anomalous condition in the regenerative braking system exists, when it is determined that an anti-lock braking system event is occurring;
indicating the occurrence of the anti-lock braking event while the anti-lock braking event is in progress; and
indicating the anomalous condition in the regenerative braking system after the anti-lock braking system event has ended and it is determined that the anomalous condition in the regenerative braking system still exits.

15. A vehicle, comprising:
an anti-lock braking system;
a regenerative braking system; and
an instrument panel including a first indicator and a second indicator, the first indicator being configured to be displayed in a first color when an anomalous condition is detected in either the anti-lock braking system or the regenerative braking system, the second indicator being configured to be displayed in a second color different from the first color when the anti-lock braking system is active, thereby providing a visual feedback to an operator of the vehicle.

16. The vehicle of claim 15, wherein the first indicator and the second indicator are contained in a single display window, thereby providing a space savings on the instrument panel.

17. The vehicle of claim 15, further comprising a fuel cell, and wherein the instrument panel further includes a fuel cell state indicator.

18. The vehicle of claim 15, wherein the instrument panel further includes at least one light source for displaying the first indicator and the second indicator, the at least one light source being configured to emit light having the first color, and further configured to emit light having the second color.

19. The vehicle of claim 18, wherein the first indicator includes a label having the second color, thereby inhibiting visibility of the first indicator when the second indicator is being displayed; and
wherein the second indicator includes a label having the first color, thereby inhibiting visibility of the second indicator when the first indicator is being displayed.

20. The vehicle of claim 19, wherein the at least one light source includes a light emitting diode.

21. The vehicle of claim 15, wherein the second indicator is displayed in the second color only when the anti-lock braking system is active and an anomalous condition is not detected in the anti-lock braking system.

22. The vehicle of claim 21, wherein the first indicator is displayed in the first color when an anomalous condition is detected in the regenerative braking system and the anti-lock braking system is not active.

* * * * *